US007292749B2

United States Patent
Glückstad et al.

(10) Patent No.: US 7,292,749 B2
(45) Date of Patent: Nov. 6, 2007

(54) SYSTEM FOR ELECTROMAGNETIC FIELD CONVERSION

(75) Inventors: Jesper Glückstad, Fredericksberg (DK); Thorkild Sørensen, Kobenhavnnv (DK)

(73) Assignee: Danmarks Tekniske Universitet, Lyngby (DK)

( * ) Notice: Subject to any disclaimer, the term of this patent is extended or adjusted under 35 U.S.C. 154(b) by 44 days.

(21) Appl. No.: 10/492,682

(22) PCT Filed: Oct. 15, 2002

(86) PCT No.: PCT/DK02/00694

§ 371 (c)(1),
(2), (4) Date: Aug. 4, 2004

(87) PCT Pub. No.: WO03/034118

PCT Pub. Date: Apr. 24, 2003

(65) Prior Publication Data

US 2004/0258353 A1  Dec. 23, 2004

Related U.S. Application Data

(60) Provisional application No. 60/329,497, filed on Oct. 17, 2001, provisional application No. 60/339,104, filed on Dec. 13, 2001.

(51) Int. Cl.
*G02B 6/26* (2006.01)
(52) U.S. Cl. .......................... 385/28; 385/27
(58) Field of Classification Search ................ 385/125, 385/131, 132, 126–127, 123, 129, 27–28; 349/196, 193
See application file for complete search history.

(56) References Cited

U.S. PATENT DOCUMENTS 5,031,991 A * 7/1991 Nakatsu et al. ............... 385/33

(Continued)

FOREIGN PATENT DOCUMENTS

EP 0 377 988 A2 7/1990

(Continued)

OTHER PUBLICATIONS

T. Hasegawa et al.; Proc. 27th Eur. Conf. on Opt. Comm. (ECOC'01—Amsterdam); "Modeling and Design Optimization of Hole-Assisted Lightguide Fiber by Full-Vector Finite Element Method"; pp. 324-325.

(Continued)

*Primary Examiner*—Brian Healy
*Assistant Examiner*—Guy G Anderson
(74) *Attorney, Agent, or Firm*—Volentine & Whitt, P.L.L.C.

(57) ABSTRACT

A system is provided for conversion of a first electromagnetic field into a desired second electromagnetic field, for example for coupling modes between waveguides or into microstructured waveguides. The system includes a complex spatial electromagnetic field converter that is positioned for reception of at least a part of the first electromagnetic field and that is adapted for conversion of the received field into the desired electromagnetic field, and wherein at least one of the first and second fields matches a mode of a microstructured waveguide. An advantage of the system is that the full effect of an incident light beam may be utilized for exciting a desired complicated mode of a specific waveguide. Another advantage is that the power of the incident beam may be coupled into one specific mode and not others, whereby a high mode suppression ratio may be achieved.

28 Claims, 8 Drawing Sheets

U.S. PATENT DOCUMENTS

| | | | |
|---|---|---|---|
| 5,082,349 A * | 1/1992 | Cordova-Plaza et al. ...... | 385/2 |
| 5,414,540 A * | 5/1995 | Patel et al. ................. | 349/196 |
| 5,526,449 A | 6/1996 | Meade et al. | |
| 6,052,213 A | 4/2000 | Burt et al. | |
| 6,064,506 A | 5/2000 | Koops | |
| 6,130,780 A | 10/2000 | Joannopoulos et al. | |
| 6,154,591 A | 11/2000 | Kershaw | |
| 6,229,828 B1 * | 5/2001 | Sanders et al. ............... | 372/22 |
| 6,240,119 B1 * | 5/2001 | Ventrudo .................... | 372/96 |
| 6,269,203 B1 * | 7/2001 | Davies et al. ................. | 385/24 |
| 6,430,328 B1 * | 8/2002 | Culver et al. ................. | 385/16 |
| 6,563,981 B2 * | 5/2003 | Weisberg et al. ............ | 385/28 |
| 6,567,584 B2 * | 5/2003 | Carlisle et al. .............. | 385/33 |
| 6,870,985 B2 * | 3/2005 | Noonan ....................... | 385/17 |
| 6,934,069 B2 * | 8/2005 | Moon et al. ................. | 359/290 |
| 6,954,252 B1 * | 10/2005 | Crossland et al. .......... | 349/196 |
| 6,972,984 B2 * | 12/2005 | Maruyama ................. | 365/145 |
| 2002/0097967 A1 * | 7/2002 | Lowry ........................ | 385/115 |
| 2002/0176149 A1 * | 11/2002 | Davis et al. ................ | 359/290 |
| 2003/0068152 A1 * | 4/2003 | Gunn, III ................... | 385/129 |
| 2003/0174956 A1 * | 9/2003 | Viens .......................... | 385/43 |
| 2004/0001677 A1 * | 1/2004 | Kondis et al. ................ | 385/93 |
| 2005/0036202 A1 * | 2/2005 | Cohen et al. ............... | 359/495 |
| 2005/0100277 A1 * | 5/2005 | Frisken ....................... | 385/37 |

FOREIGN PATENT DOCUMENTS

| | | |
|---|---|---|
| EP | 1 136 853 A1 | 9/2001 |
| WO | WO 99/64903 | 12/1999 |
| WO | WO 99/64904 | 12/1999 |
| WO | WO 00/60390 | 10/2000 |
| WO | WO 00/65386 | 11/2000 |

OTHER PUBLICATIONS

J. Broeng et al; J. Opt. A: Pure Appl. Opt. 1; "Waveguidance by the Photonic Bandgap Effect in Optical Fibres"; pp. 477-482; 1999.

S. Choi et al; Proc. 27th Eur. Conf. on Opt. Comm (ECOC'01 —Amsterdam); "A New Mode Converter Based On Hollow Optical Fiber For Gigabit Lan Communication"; pp. 326-327.

J. Broeng et al.; "Research Paper: Crystal Fibre Technology"; Research Center COM, Technical University of Denmark; pp. 22-28; Feb. 2000.

W.Q. Thornburg et al; Optics Letters; "Selective Launching of Higher-Order Modes into an Optical Fiber with an Optical Phase Shifter"; vol. 19; No. 7; pp. 454-456; Apr. 1, 1994.

* cited by examiner

SYSTEM FOR ELECTROMAGNETIC FIELD CONVERSION

This application claims the benefit under 35 U.S.C. 119(e) of U.S. Provisional Application No. 60/329,497, filed on Oct. 17, 2001, and U.S. Provisional Application No. 60/339,104, filed on Dec. 13, 2001.

FIELD OF THE INVENTION

The present invention relates to a system for conversion of a first electromagnetic field to a desired second electromagnetic field, for example for coupling of an electromagnetic field into an electromagnetic waveguide.

BACKGROUND OF THE INVENTION

In order to couple light emitted by a light emitting diode or a semiconductor laser into an optical fiber, such as a single mode fiber, it is well known to use a butt coupling or a lens coupling. The butt coupling is a direct coupling Wherein the fiber is brought close to the light source. The butt coupling provides only about 10% efficiency for a laser, as it makes no attempt to match the mode sizes of the laser and the fiber. For example, the laser mode size may be about 1 μm and the mode size of a single mode fiber may be in the range 6-9 μm. The coupling efficiency may be Improved by tapering the fiber end and forming a lens at the fiber tip.

In a lens coupling design, the coupling efficiency can exceed 70% for a confocal design in which a sphere is used to collimate the laser light and focus it onto the fiber core. The alignment of the fiber core is less critical for the confocal design because the spot size is matched to the fiber's mode size.

These coupling approaches are well suited for excitation of first order modes in optical fibers since the phase of a first order mode does not vary over the fiber cross-section, rather it fits with an electromagnetic field with a symmetric phase and amplitude wave front, such as the electromagnetic field in a light beam emitted by a laser. The phase distribution of a second-order mode, however, is usually symmetric in magnitude but changes sign about a symmetry axis of the fiber, and for higher order modes the phases change sign several times across the cross-section of the fiber. In order to excite higher order modes, the incident electromagnetic beam is typically focused on a part of the cross-section of the fiber, namely an area within which the phase does not change sign. This limits the obtainable coupling efficiency to a value that is roughly equal to the ratio between the illuminated area and the total cross-sectional area of the fiber core. This may be seen by the overlap integral (or inner product) between the two mode plots.

In "Selective launching of higher-order modes into an optical fiber with an optical phase shifter", by W. Q. Thornburg, B. J. Corrado, and X. D. Zhu, Optics Letters, vol. 19, No. 7, Apr. 1, 1994, a coupling approach is disclosed for exciting a second order mode in a weakly guided, cylindrically symmetric step-index fiber by phase shifting one bisection of the beam so that polarization and phase front of the incident beam matches the desired mode.

As for example disclosed in "Crystal fiber technology", Jes Broeng, Stig E. Barkou, Anders Bjarklev, Thomas Søndergaard, and Erik Knudsen, DOPS-NYT 2-2000, and "Waveguidance by the photonic band gap effect in optical fibres", Jes Broeng, Stig E. Barkou, Anders Bjarklev, Thomas Søndergaard, and Pablo M Barbeito, recently, a new approach of making optical fibers has been invented by Professor Philip Russell and his team at the Department of Physics at the University of Bath. In an optical fiber produced according to the new approach, bundles of microscopic dielectric pipes extend along a longitudinal axis of the fiber. Thus, a cross-section of the fiber exhibits holes arranged in an array like atoms in a crystal, hence the name crystal fibers also known as microstructured or holey fibers. The dielectric may be silica, doped silica, polymers, etc.

In index-guided crystal fibers, one or more holes are missing at the center of the array. Without the holes, the glass at the center has a higher density than its surroundings, and light entering the center, i.e. the core, is therefore confined much as it would be in a conventional fiber. The advantage is that the effect is achieved without necessarily having to use two different kinds of glass. An added benefit is that the light can be squeezed into a much narrower core than is the case in conventional fibers, or large mode area single mode fibers can be made. There is a great taylorability of mode size and general mode properties in a photonic crystal fiber (PCF).

In photonic crystal fibers operating by photonic band gap effect (PBG fibers), the holes are arranged in a photonic crystal with band gaps wherein no modes can propagate through tho fiber. By locally breaking the periodicity of the photonic crystal, a spatial region with optical properties different from the surrounding bulk photonic crystal can be created. If such a defect region supports modes with frequencies falling inside the forbidden gap of the surrounding full-periodic microstructure, these modes will be strongly confined to the defect. It is important to note that it is not a requirement that the defect region has a higher index than its surroundings. If the surrounding material exhibits photonic band gap effects, even a low-index defect region is able to confine light and thereby act as a highly unusual waveguide. The defect may be an air filled tube that may provide—in theory—no loss guidance over long distances.

It has been shown that photonic crystal fibers may support single mode operation in a larger wavelength range than conventional fibers. e.g. from UV light to mid-infrared wavelengths, i.e. the entire wavelength range where silica can be used, and that photonic crystal fibers can be designed with a very flat near-zero dispersion over a very broad wavelength range. Further, photonic crystal fibers may be produced with very large positive dispersion for single-mode operation, This may be utilized for dispersion management in fiber systems with negative dispersion or vice versa.

Photonic crystals are structures having a periodic variation in dielectric constant. The dielectric may be silica, doped silica, polymers, etc. By fabricating photonic crystals having specific periodicities, the properties of the photonic band gap can be designed to specific applications. For example, the central wavelength of a photonic band gap is approximately equal to (in order of magnitude) the periodicity of the photonic crystal and the width of the photonic band gap is proportional to the differences in dielectric constant within the photonic crystals, For a general reference, see: J. D. Joannopoulos et al., Photontic Crystals, Princeton University Press, Princeton, 1995. By inclusion of defects with respect to their periodicity in photonic crystals, a localized electromagnetic mode having a frequency within a photonic band gap may be supported. For example, in a three-dimensional photonic crystal formed by dielectric spheres at the sites of a diamond lattice, the absence of a sphere produces a defect. In the immediate vicinity of the absent sphere, the photonic crystal is no longer periodic, and a localized electromagnetic mode having a frequency within the photonic band gap can exist. This defect mode cannot propagate away from the absent void, it is localized in the vicinity of the defect. Thus, the introduction of a defect into the photonic crystal creates a resonant cavity, i.e. a region of the crystal that confines electromagnetic radiation having a specific frequency within the region. A series of defects can be combined to form a waveguide within the photonic crystal. Such waveguides in photonic crystals can include sharp turns, such as 90° bends substantially without loss. For example, U.S. Pat. No. 5,526,449 discloses waveguides based on photonic crystals for incorporation into opto-electronic integrated circuits.

The crystal fibers previously mentioned are examples of two-dimensional photonic crystals with electromagnetic mode supporting defects. A large variety of design options is available to the designer of crystal fibers. By careful selection of preform tube geometry, tube density, tube positions, and utilization of tubes of different types in the same fiber, the designer can provide waveguides with desired characteristics, such as transmission loss, dispersion, non-linearity, mode structure, micro- and macro-bend loss, etc. Examples of various designs are disclosed in WO 99/64903, WO 99/64904, and WO 00/60390.

Examples of one-dimensional photonic crystals are given in U.S. Pat. No. 6,130,780 disclosing an omni-directional reflector with a surface and a refractive index variation along the direction perpendicular to the surface so that a range of frequencies exists defining a photonic band gap for electromagnetic energy incident along the perpendicular direction to the surface The structure further fulfils a criterion by which no propagating states may couple to an incident wave and thus the dielectric structure acts as a perfect reflector in a given frequency range for all incident angles and polarizations.

In WO 00/65386, an all-dielectric coaxial waveguide is disclosed that is designated a coaxial omniguide and that is based on the omni-directional dielectric reflector disclosed in U.S. Pat. No. 6,130,780. The radial confinement of the light in the coaxial omniguide is a consequence of omni-directional reflection and not total internal reflection. This means that the coaxial omniguide can be used to transmit light around much sharper corners than the optical fiber. Also, the radial decay of the electromagnetic field in the coaxial omniguide is much greater than in the case of the optical fiber so that the outer diameter of the coaxial omniguide can be much smaller than the diameter of the cladding layer of the optical fiber without leading to cross-talk.

SUMMARY OF THE INVENTION

In the following a microstructured waveguide designates a one-, two- or three-dimensional photonic crystal with defects for propagation of an electromagnetic field and optionally with interstitial voids, such as index-guided crystal fibers, photonic band gap crystal fibers, coaxial omniguides, polymer optical fibers, polymer crystal fibers, hole assisted light guide fibers (e.g. as disclosed in "Modeling and design optimization of hole-assisted lightguide fiber by full-vector finite element method", by T. Hasegawa et. al. Proc. 27$^{th}$ Eur. Conf. On Opt Comm. ECOC'01 —Amsterdam), hollow optical fiber (e.g. as disclosed in "A new mode converter based on hollow optical fiber for gigabit LAN communication", S. Choi et. al., Proc. 27$^{th}$ Eur. Conf On Opt. Comm., ECOC'01 —Amsterdam), waveguides in integrated optical circuits, such as photonic crystal based planar waveguides, a slab waveguide structure, etc, a surface plasmon polariton based waveguide, resonators, coupled cavity waveguides, coupling resonator optical waveguides, photonic Wire waveguides (ie. very tightly confined waveguides), couplers, power splitters, combiners, e.g. 3 dB couplers, etc. A microstructured waveguide may transmit an electromagnetic field passively, or may form part of an active component, e.g. a rare earth doped fiber amplifier, such as an Er doped fiber amplifier, an Yb doped fiber amplifier, etc, a Raman amplifier, a Brilouin amplifier, etc.

When a desired mode propagating through a microstructured waveguide is of a high order, the phase of the propagating electromagnetic field or wave changes sign at least once across the cross-section of the waveguide. As previously described, such a mode is typically excited by focusing an incident light beam on an area of the waveguide end within which the phase does not change its sign.

Thus, there is a need for a coupling approach that can excite a desired mode in a microstructured waveguide with a high coupling efficiency. There is also a need for a system that excites a desired mode without exciting other modes, i.e. to Suppress other modes than the desired one while still keeping an efficient coupling to the desired mode.

Likewise, there is a need for an approach of converting a high order mode emitted from a microstructured waveguide to a mode that matches a mode in a conventional waveguide, such as a single mode step index fiber, a graded index fiber, such as a parabolic index fiber, e.g. a multimode parabolic index fiber.

According to the present invention this and other objects are fulfilled by utilization of a complex spatial electromagnetic field converter for conversion of a given first electromagnetic field into a desired second electromagnetic field.

At least one of the fields may match a mode of a microstructured waveguide.

For example, the first electromagnetic field may be emitted from an output end of the microstructured waveguide.

For example, a light beam emitted by a semiconductor laser may be converted into a second electromagnetic field that matches a mode of a microstructured waveguide.

In the present disclosure, an electromagnetic field is said to match a mode of a microstructured waveguide when the electromagnetic field in question can excite the mode of the waveguide with a coupling efficiency that exceeds the ratio between an area of the cross-section of the waveguide within which the phase of the mode in question does not change its sign and the entire cross-section of propagating region of the waveguide.

In a preferred embodiment of the invention the matching field is substantially equal to the field of the mode in question.

It is an important advantage of the present invention that the full effect of an incident light beam may be utilized for exciting a desired mode of a specific waveguide since the illumination of the waveguide end is no longer required to be confined to a part of the waveguide end within which the phase of the mode in question does not change its sign.

It is another Important advantage that the power of the incident beam may be coupled into one specific mode and not others whereby a high mode suppression ratio may be achieved.

The electromagnetic radiation may be of any frequency range of the electromagnetic spectrum, i.e. the gamma frequency range, the ultraviolet range, the visible range, the infrared range, the telecommunication band or bands, the far infrared range, the X-ray range, the microwave range, the HF (high frequency) range, etc.

Preferably, the electromagnetic radiation is generated by a coherent source of electromagnetic radiation, such as a laser, a semi-conductor laser, a strained multi-quantum well laser, a vertical cavity surface emitting laser (VCSEL), a maser, a phase-locked laser diode array, a light emitting diode, a pulsed laser, such as a sub-picosecond laser, etc. However a high pressure arc lamp, such as a Hg lamp, a Xe lamp etc, may also be used and even an incandescent lamp may be used as a source of electromagnetic radiation.

The complex spatial electromagnetic field converter may modulate an impinging field by reflection, refraction, or diffraction or any combination hereof, Further, the complex spatial electromagnetic field converter may modulate phase, amplitude, polarization, or mode field diameter, or any combination hereof.

The complex spatial electromagnetic field converter may comprise a refractive element, such as a refractive element with a surface structure providing the desired phase modulation, e.g. a surface etched structure, or a lenslet array, a ball lens, a semi-ball lens, an aspheric lens or a lens that is not circular symmetric, an-amorphic optics, mirrors that are deformed to provide the desired phase modulation, a refractive phase plate, a GRIN (graded index) material, beamsplitter, etc.

The complex spatial electromagnetic field converter may comprise a spatial light modulator.

The spatial light modulator may comprise resolution elements (x, y), each resolution element (x, y) modulating the phase and/or the amplitude of electromagnetic radiation incident upon it with a predetermined complex value $a(x, y)e^{i\phi(x,y)}$, i.e. the amplitude of the electromagnetic field incident upon the resolution element (x, y) is multiplied by $a(x, y)$ and $\phi(x, y)$ is added to the corresponding phase. The amplitude modulation $a(x, y)$ may be set to unity to obtain a phase modulation, and $\phi(x, y)$ may be sot to zero to obtain an amplitude modulation, Further, the spatial light modulator may modulate the polarization of the incoming electromagnetic field by selectively modulating vector components of the field individually by each resolution element (x, y).

Each resolution element may be addressed either optically or electrically. The electrical addressing technique resembles the addressing technique of solid-state memories in that each resolution element can be addressed through electronic circuitry to receive a control signal corresponding to the phase and/or amplitude change to be generated by the addressed resolution element. The optical addressing technique addresses each resolution element by pointing a light beam on it, the intensity of the light beam corresponding to the modulation change to be generated by the resolution element illuminated by the light beam.

The Spatial light modulator (SLM) may be a fixed phase mask, a liquid crystal device based on liquid crystal display technology, a MEMS (micro electro-mechanical system), a MOEMS (micro opto-electro-mechanical system), such as a dynamic mirror device, a digital micro-mirror array, a deformable mirror device, etc, a membrane spatial light modulator, a laser diode array (integrated light source and phase modulator), smart pixel arrays, etc.

Selko-Epson produces a transmitting liquid crystal SLM (LC-SLM) having a high resolution matrix of transparent liquid crystal elements wherein the relative permittivity of each element can be electrically modulated in order to vary the refractive index and thereby the optical path length of the element. Meadowlark produces a parallel-aligned liquid crystal (PAL-SLM) with a high fill factor, but this device has a very low resolution in that it contains only 137 phase-modulating elements.

Hamamatsu Photonics produces a dynamically controllable PAL-SLM with VGA or XGA resolution.

Texas Instruments produces a Digital Mirror Device (DMD) having an array of mirrors each of which can be tilted between two positions.

The complex spatial electromagnetic field converter may comprise a diffractive optical element (DOE), e.g a holographic optical element (HOE), A DOE operates on the principle of diffraction, Traditional optical elements use their shape to bend light. DOEs comprise diffractive gratings or fringe patterns that, in response to an incident wave, generate a plurality of electromagnetic waves which recombine to form the desired waves A grating or a fringe pattern may be a lattice of point or line scatterers and/or a lattice of similar refractive index modulations.

DOEs can function as gratings, lenses, aspherics or any other type of optical element. Large optical apertures, light weight and lower cost are the main features of DOEs. They can offer unique optical properties that are not possible with conventional optical elements.

Several different optical elements can share the same substrate without interfering with one another, Thus, a single DOE can be used as a lens, beam splitter and spectral filter simultaneously.

Diffractive elements are very light, as they are formed in thin films of a few μm thickness only. A diffractive element can be fabricated on any arbitrary shape of the substrate. They can be made to operate over a narrow wavelength band.

The fabrication and replication of DOEs are relatively easy and cheap because no precision shaping of a surface is required.

By using real-time recyclable recording media, any desired system function can be recorded and erased repeatedly.

In traditional holography an interference between an object beam and a reference beam is created and recorded on a photographic emulsion.

More than one independent interference pattern can be stored in the same recording media without any cross-talk.

A hologram may be of an absorption type Which produces a change in the amplitude of the reconstruction beam. The phase type hologram produces phase changes in the reconstruction beam due to a variation in the refractive index or thickness of the medium. Phase holograms have the advantage over amplitude holograms of no energy dissipation within the hologram medium and higher diffraction efficiency. Holograms recorded in photographic emulsions change both the amplitude and the phase of the illuminating wave. The shape of the recorded fringe planes depend on the relative phase of the interfering beams.

A volume (thick) hologram may be regarded as a superposition of three-dimensional gratings recorded in the depth of the emulsion each satisfying the Bragg condition. The grating planes in a volume hologram produce maximum change in refractive index and/or absorption index. A consequence of Bragg condition is that the volume hologram reconstructs the virtual image at the original position of the object if the reconstruction beam exactly coincides with the reference beam. However, the conjugate image and higher order diffractions are absent.

Holographic optical elements may comprise interferometrically generated holograms. computer-generated holograms including kinoforms, E-beam written holograms, edge-illuminated holograms, waveguide coupled holograms, deep surface relief holograms, micro-machined holograms, and Fresnel zone plates.

DETAILED DESCRIPTION OF PREFERRED EMBODIMENTS

Figure 1:
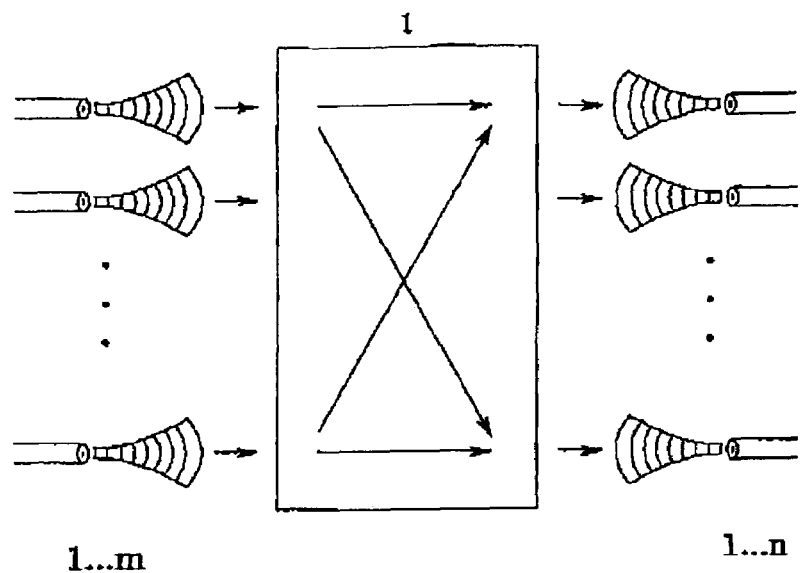
FIG. 1 illustrates the general principle of present invention.

FIG. 1 illustrates the general principle of the present invention wherein the first electromagnetic field is generated by superposition of electromagnetic fields emitted from a first set of waveguides 1, 2, . . . , m. The system 1 comprising the complex spatial electromagnetic field converter 4 converts the first electromagnetic field into the desired second electromagnetic field that is the superposition of desired propagating modes of a second set of waveguides 1, 2, . . . , n. The system operates to perform both mode conversion and switching.

Figure 2:
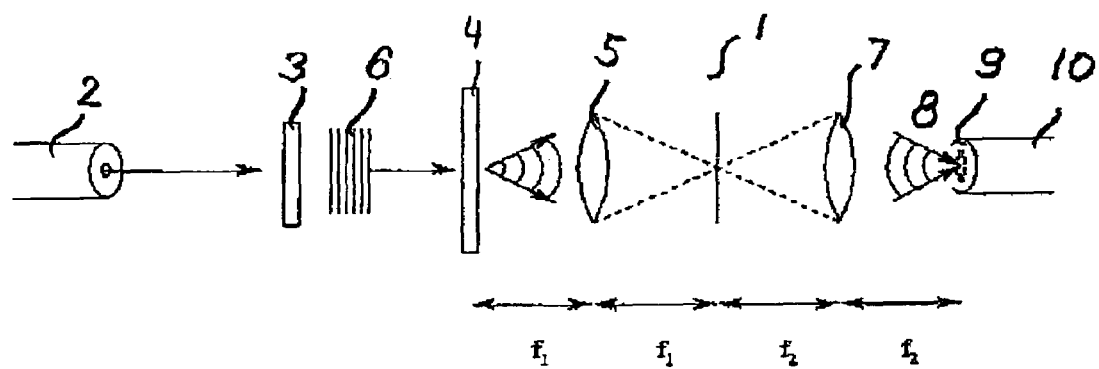
FIG. 2 shows a 4f optical system for electromagnetic field conversion in accordance with the present invention.

FIG. 2 shows a 4f optical system 1 for conversion of a first electromagnetic field 6, namely a light beam emitted by a laser 2 and collimated by the collimator 3, into a desired second electromagnetic field 8 for propagation through the microstructured waveguide 10. A complex spatial electromagnetic field converter 4, such as a spatial light modulator (SLM), is positioned for reception of the first electromagnetic field 6 that is transmitted through tile complex spatial electromagnetic field converter 4 and a Fourier transforming lens 5 having a focal length $f_1$. The complex spatial electromagnetic field converter 4 is positioned in the front focal plane of the lens 5. Another Fourier transforming lens 7 with a focal length $f_2$ is positioned so that its front focal plane coincides with the back focal plane of lens 5 as is well known in 4f optical systems. The magnification of the system is $f_2/f_1$. The converted electromagnetic field 8 is generated in the back focal plane 9 of the lens 7 and input to the microstructured Waveguide 10. It is seen that the surface of the complex spatial electromagnetic field converter 4 is imaged onto the end surface of the waveguide 10 by the Fourier transforming lenses 5, 7, e.g. (x, y) is imaged onto (x', y') at the end of the waveguide 10. As previously described, each resolution element (x, y) of a spatial light modulator modulates the phase and the amplitude of electromagnetic radiation incident upon it with a predetermined complex value $a(x, y)e^{i\phi(x, y)}$. Further the spatial light modulator may modulate the polarization of the incoming electromagnetic field by selectively modulating vector components of the field individually by each resolution element (x, y). Thus, the values of a(x, y) and φ(x, y) for each vector component are determined from the amplitude and phase values at corresponding positions (x', y') at the waveguide end of the desired waveguide mode whereby the collimated electromagnetic field 6 is converted into the desired electromagnetic field 8 that matches a desired mode of the microstructured waveguide 10.

The system 1 may be simplified by positioning of the complex spatial electromagnetic field converter 4 in the Fourier plane of lens 5, i.e. the front focal plane of lens 7, and removal of lens 5. This requires that the complex spatial electromagnetic field converter 4 converts the incoming electromagnetic field 6 into the Fourier transformed field of the desired mode of the waveguide 10 since the lens 7 generates a Fourier transformation of the field at the output surface of the complex spatial electromagnetic field converter 4. In this case the resolution, i.e. number of resolution elements, of the complex spatial electromagnetic field converter 4 must be much higher than for the 4f system of FIG. 1.

The lenses 5, 7 may be compound lenses, doublets, achromats, f-theta lenses. microscope lenses, microscope objectives, graded-Index lenses, aspherical lenses and/or non-circularly symmetrical lenses, etc. Further, the lenses 5, 7 may be ball lenses offering a system of a small size.

The complex spatial electromagnetic field converter 4 may be a spatial light modulator (SLM), such as a phase-only spatial light modulator (POSLM) wherein the amplitude of the field is not modulated, a complex spatial light modulator modulating amplitude and phase, or a polarization modulator also modifying the field vector components of the electromagnetic field.

The microstructured Waveguide may be an index-guided crystal fiber, photonic band gap crystal fiber, coaxial omniguide, polymer optical fiber, polymer crystal fiber, hole assisted light guide fiber, hollow optical fiber, waveguides in integrated optical circuits, such as photonic crystal based planar waveguides, a slab waveguide structure, etc, a surface plasmon polariton based waveguide, resonators, coupled cavity waveguides, coupling resonator optical waveguides, photonic wire waveguides (i.e. very tightly confined waveguides), couplers, powersplitters, combiners, e.g. 3 dB couplers, etc, A microstructured waveguide may transmit an electromagnetic field passively or may form part of an active component, e.g. a rare earth doped fiber amplifier, such as an Er doped fiber amplifier, an Yb doped fiber amplifier, etc, Raman amplifier, Brillouin amplifier, etc.

It is obvious that other systems according to the present invention may be designed with optical components in Fresnel planes.

Figure 3:
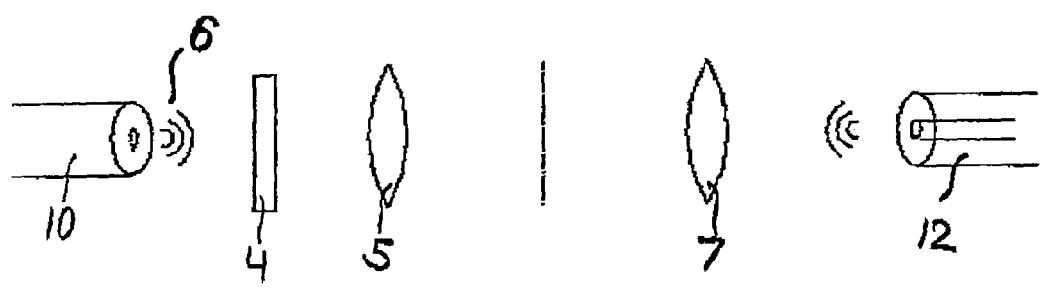
FIG. 3 shows another 4f optical system for electromagnetic field conversion in accordance with the present invention, FIG. 4 schematically shows a combination of the system illustrated in FIG. 3 with the system illustrated in FIG. 11, FIG. 5 schematically shows the microstructure of an exemplary photonic crystal fiber, FIG. 6 schematically shows the cross-sectional phase distribution of a propagating mode of the photonic crystal fiber of FIG. 5, FIGS. 7, 8 illustrate utilization of an analog hologram as a complex spatial electronmagnetic field converter.

FIG. 3 shows a 4f optical system similar to the system shown in FIG. 2, however in FIG. 3 the electromagnetic field 6 to be converted is emitted by a microstructured waveguide 10. The complex spatial electromagnetic field converter 4 is adapted to convert the mode of the microstructured waveguide 10 into the mode of the single mode step index fiber 12, Of course the single mode step index fiber 12 may be substituted with any of the fibers mentioned above.

Figure 4:
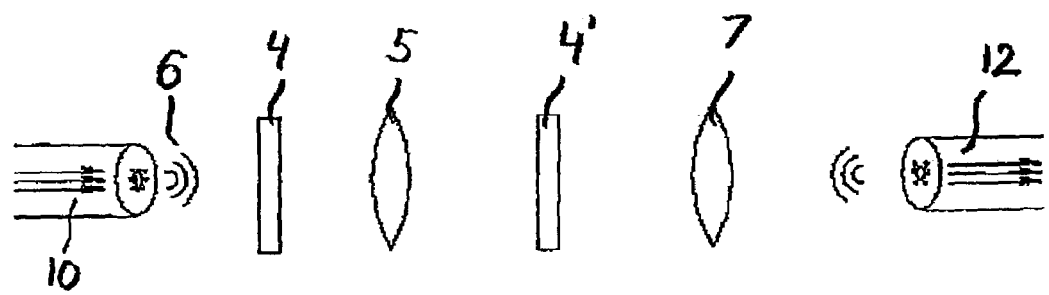
Figure 11:
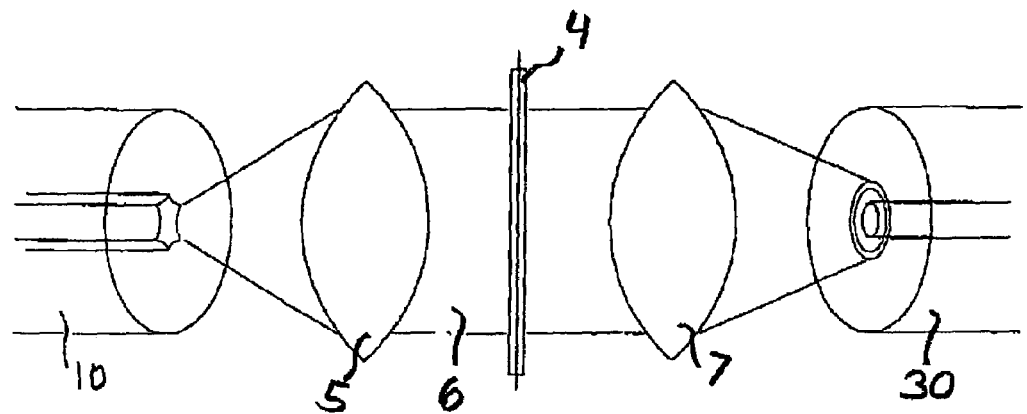
FIG. 11 shows another 4f optical system wherein the complex spatial electromagnetic field converter 4 is positioned in the Fourier plane of the first Fourier transforming lens 5.

FIG. 4 combines the system illustrated in FIG. 3 with the system illustrated in FIG. 11 whereby system requirements of each of the complex spatial electromagnetic field converters may be lowered compared to the previously illustrated systems. For example, POSLMs may be used For provision of both amplitude and phase modulation.

Figure 5:
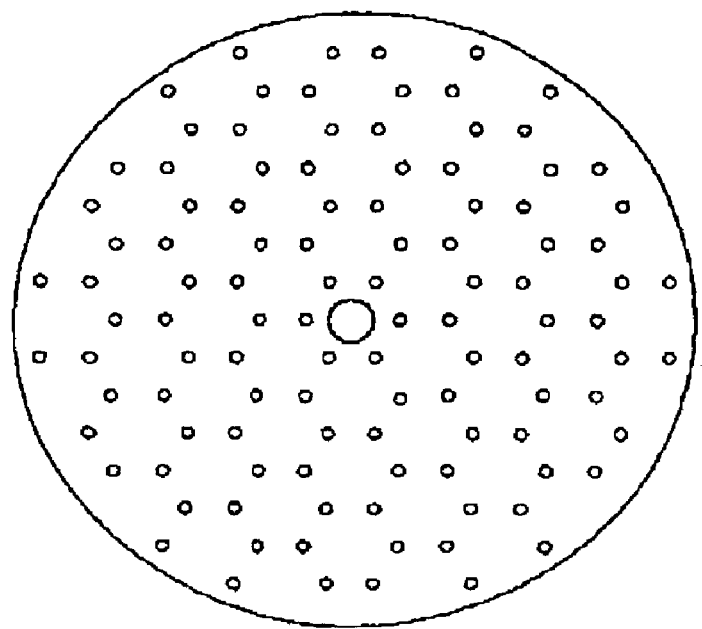
Figure 6:
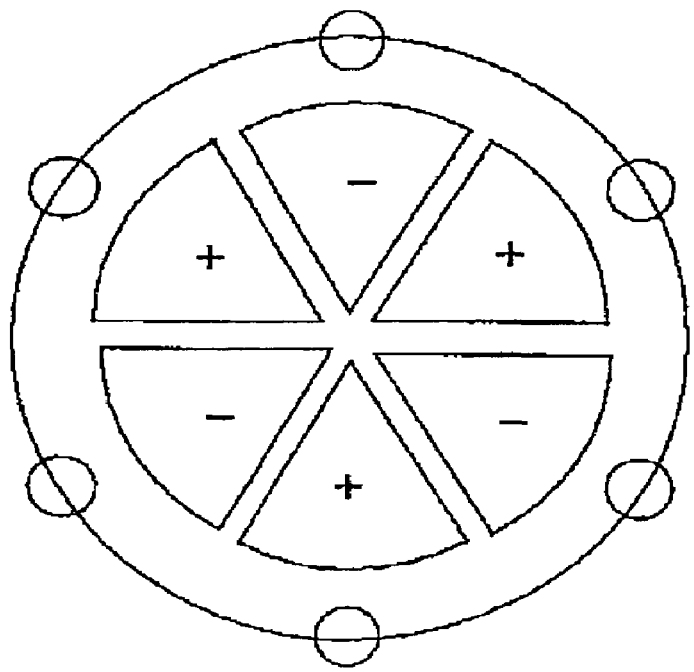

FIG. 5 schematically shows the microstructure of an exemplary photonic band gap crystal fiber, and FIG. 6 schematically shows the cross-sectional phase distribution of a propagating mode of the photonic band gap crystal fiber, it is seen that in this case the phase changes sign six times as a function of the angular position in a cross-section of the fiber. In a preferred embodiment of the invention, the complex spatial electromagnetic field converter 4 is dynamically adjustable. For example, the resolution elements (x, y) of a spatial light modulator may be addressed so that the modulating values of a(x, y) and φ(x, y) can be adjusted. In this way the modulation pattern $a(x, y)e^{i\phi(x, y)}$ of the spatial light modulator may be rotated until its phase pattern coincides with the phase pattern of the mode of the waveguide 10 either in the case wherein the first electromagnetic field 6 is emitted by the waveguide 10 or wherein the converted second field is coupled into the waveguide 10.

Also the modulation pattern may be adjusted to selectively match different desired modes of the waveguide 10, or a desired mode may selectively be turned on or off with a powerful suppression of possible other modes if desired.

It should be noted that the illustrated propagating mode of FIG. 4 is an example. Fibers may be provided with propagating modes with an arbitrary number of phase changes radially and tangentially across a cross-section of the fiber.

Figure 7:
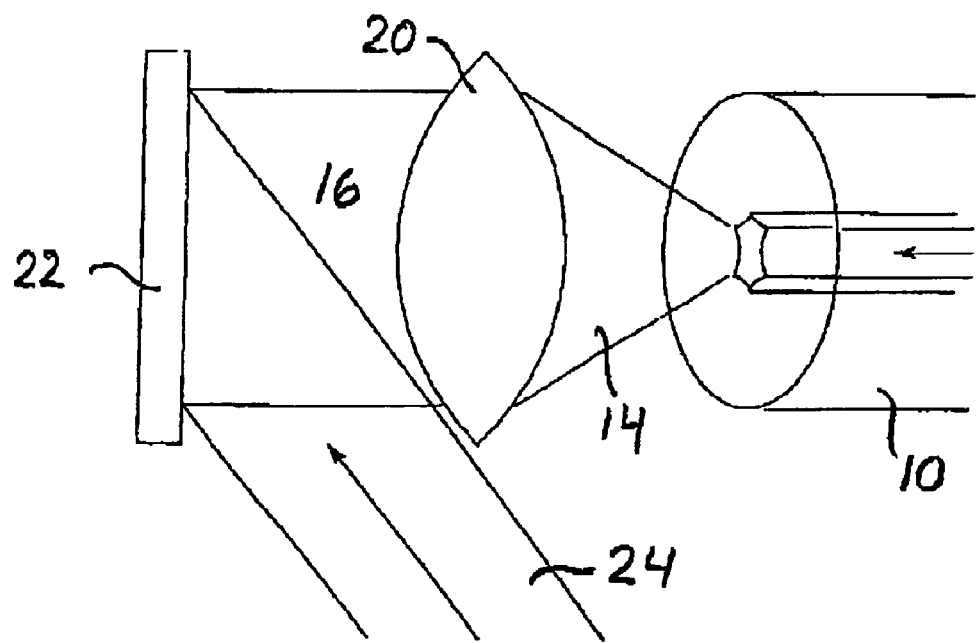
Figure 8:
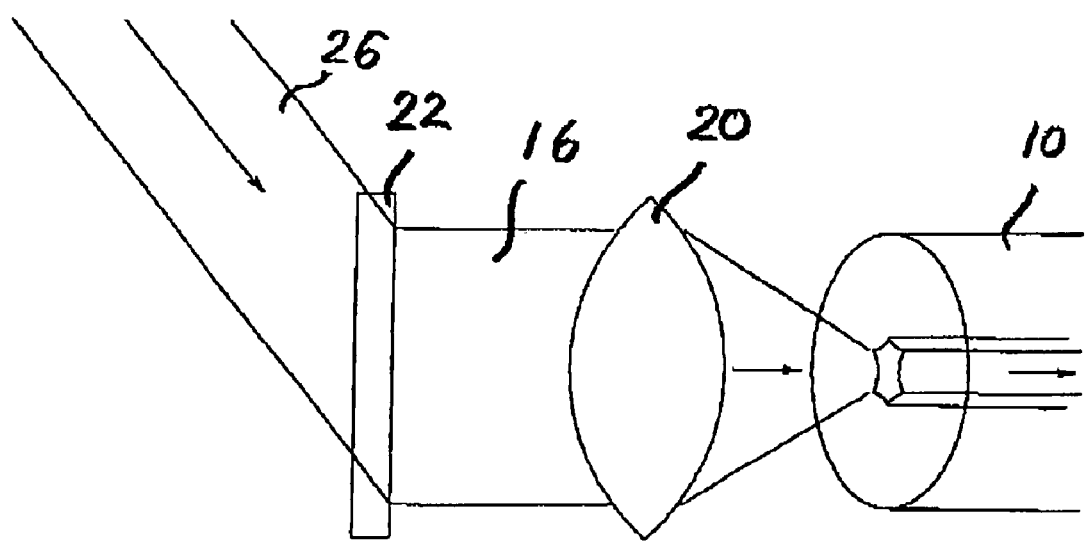

FIGS. 7 and 8 illustrate utilization of an analog hologram as a complex spatial electromagnetic field converter. In FIG. 7, light 14 of a desired mode of a microstructured waveguide 10 is emitted from the end of the waveguide 10 and is collimated by the lens 20 and impinges on the surface of the hologram 22 for interference with a collimated reference beam 24. The reference beam may be emitted by a semiconductor laser, by another microstructured waveguide, a conventional optical fiber, etc. In FIG. 8, the desired mode is excited in the waveguide 10 by emitting a conjugated reference beam 26 towards the hologram 22 whereby the collimated electromagnetic field 16 of the desired mode is regenerated for coupling into the waveguide 10. Obviously, the fringe pattern of the hologram 22 may be computer generated thus, eliminating the need for the optical recording set-up illustrated in FIG. 7.

Figure 9:
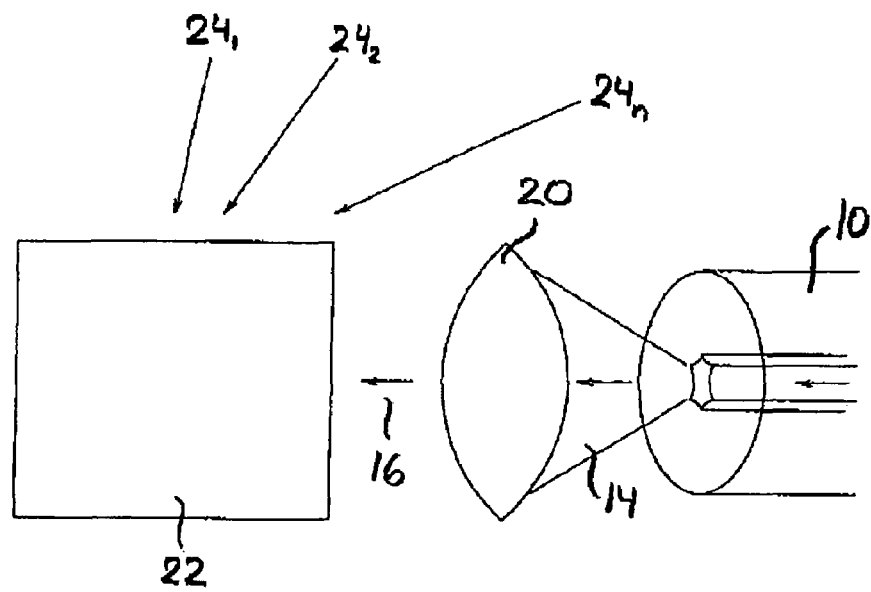
FIGS. 9, 10 illustrate utilization of a volume hologram as a complex spatial electromagnetic field converter.
Figure 10:
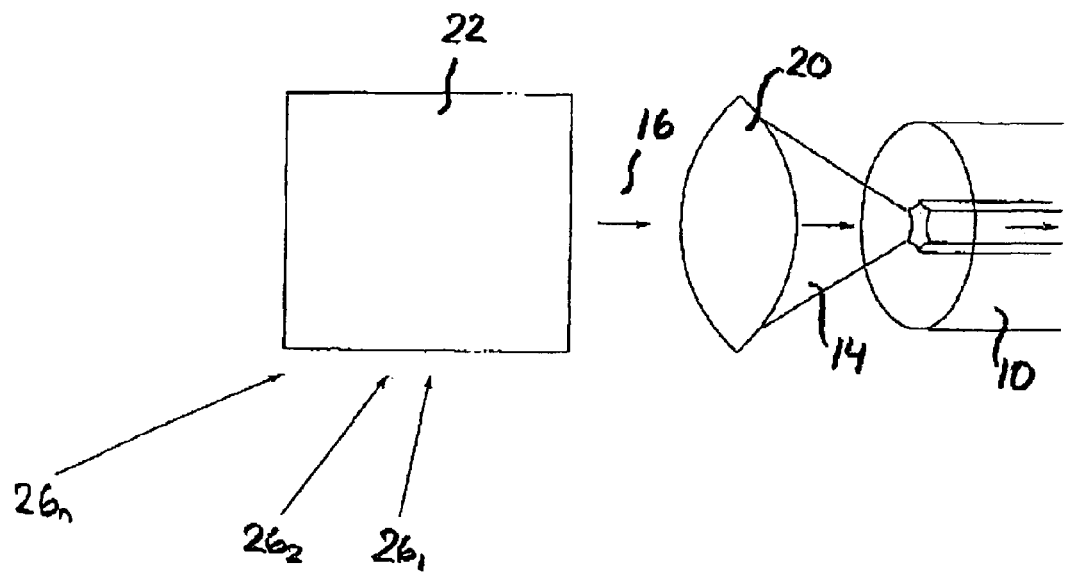

FIGS. 9 and 10 illustrate utilization of a volume hologram 22 as a complex spatial electromagnetic field converter. In FIG. 9, light 14 of a desired mode of a microstructured waveguide 10 is emitted from the end of the waveguide 10 and is collimated by the lens 20 and impinges on the hologram 22 for interference with a collimated reference beam 24₁. Different desired modes of the waveguide 10 may be recorded on the volume hologram 22 with different respective reference beams $24_1, 24_2, \ldots, 24_n$. Again, the reference beam may be emitted by a semiconductor laser, by another microstructured waveguide, a conventional optical fiber, etc. In FIG. 10, one of the desired modes is selectively excited in the waveguide 10 by emitting the corresponding conjugated reference beam $26_i$ towards the hologram 22 whereby the collimated electromagnetic field 16 of the desired mode is regenerated for coupling into the waveguide 10.

In a diffractive optical element, electromagnetic field converting fringe patterns may be combined with other functional fringe patterns, such as beam splitting fringe patterns. Thus, the incoming field 6 may be generated by several waveguides, and likewise the converted electromagnetic field may be directed towards a plurality of waveguides and, in combination with such a diffractive optical element, waveguide couplers, switches, etc. may be provided. A dynamic optical element that is recorded in a dynamically rewriteable medium may provide dynamic switching between waveguides.

FIG. 11 shows another 4f optical system wherein the electromagnetic field 6 to be converted is emitted by a microstructured waveguide 10, and the complex spatial electromagnetic field converter 4 is positioned in the Fourier plane of the first Fourier transforming lens 5 which coincides with the front focal plane of second lens 7. The complex spatial electromagnetic field converter 4 multiples the collimated electromagnetic field with a filter function $a(x, y)e^{i\Phi(x, y)}$ that has been predetermined so that the Fourier transformed of the Fourier transformed incoming field 6 times the filter function matches the desired mode of the coaxial omniguide 30.

In FIG. 11, the coaxial omniguide may be replaced by a detector, and the filter function of the complex spatial electromagnetic field converter 4 may be a correlator function providing a peak output when the incoming collimated field 6 matches the correlator function. This may be utilized in waveguide sensing systems wherein the propagating mode of the waveguide 10 is changed in response to a specific influence. The change may be detected utilizing an appropriate correlator function, e.g. In relation to detection of strain, rotation, tilt, off-set, temperature, etc. In hollow core waveguides, such as air core photonic crystal fibers, hole assisted light guide fibers, single hole core doped fibers, etc, this may be utilized for detection of presence of specific substances, pressure detection, etc.

Figure 12:
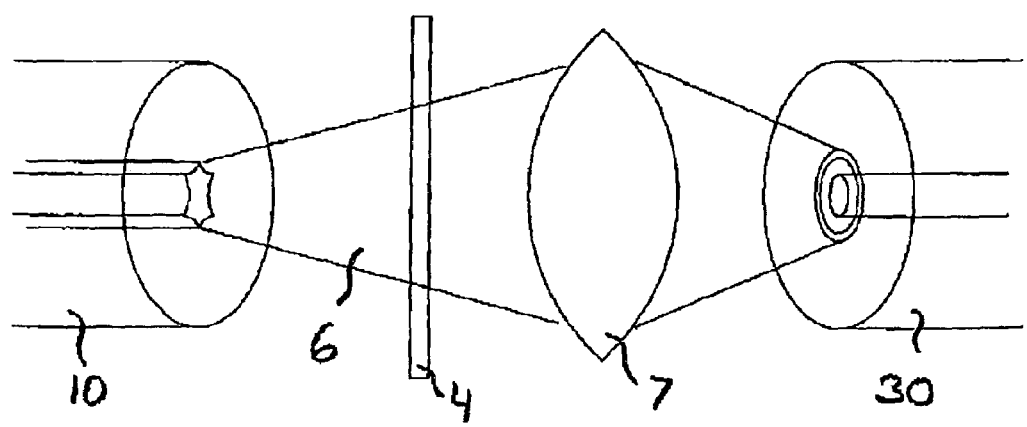
FIG. 12 shows an optical system for electromagnetic field conversion with one lens.

In FIG. 12, the electromagnetic field 6 to be converted is emitted by a microstructured waveguide 10. The complex spatial electromagnetic field converter 4 is arranged perpendicular to the longitudinal axis of the waveguide 10. The electromagnetic field 6 emitted by the waveguide broadens into an expanded region as it emerges from the waveguide. When the field 6 passes through the complex spatial electromagnetic field converter 4 the amplitude and/or phase is changed. A focusing lens 7 focuses the field into the coaxial omniguide 30.

Figure 13:
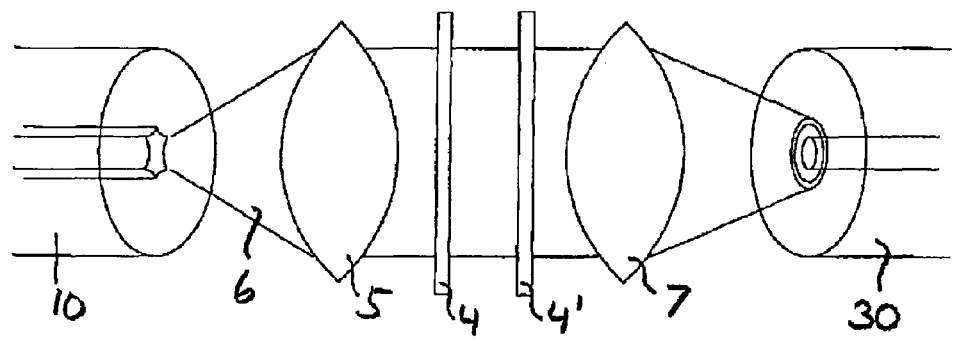
FIG. 13 shows a system according to the present invention comprising a plurality of the complex spatial electromagnetic field converters 4, 4'.

FIG. 13 shows a system according to the present invention comprising a plurality of the complex spatial electromagnetic field converters 4, 4'. The electromagnetic field emitted by a microstructured waveguide 10 is collimated by lens 5 and then it passes through two complex spatial electromagnetic field converters 4, 4' and is finally focused by lens 7 into the coaxial omniguide 30.

Figure 14:
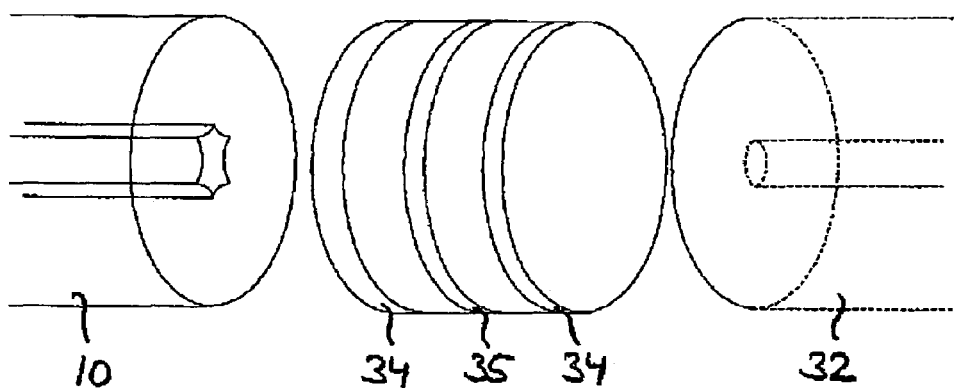
FIG. 14 shows a system according to the present invention integrated into a waveguide module.

FIG. 14 schematically shows a system according to the present invention integrated into a waveguide module. The integration is provided utilizing GRIN lenses 34 and a micro-hologram 35. All of the previously suggested systems may be integrated in one waveguide coupling module, such as a flip-flop module for a wafer with integrated waveguide(s), or, a fiber coupling module that may be fused to e.g. optical fibers, etc.

Figure 15:
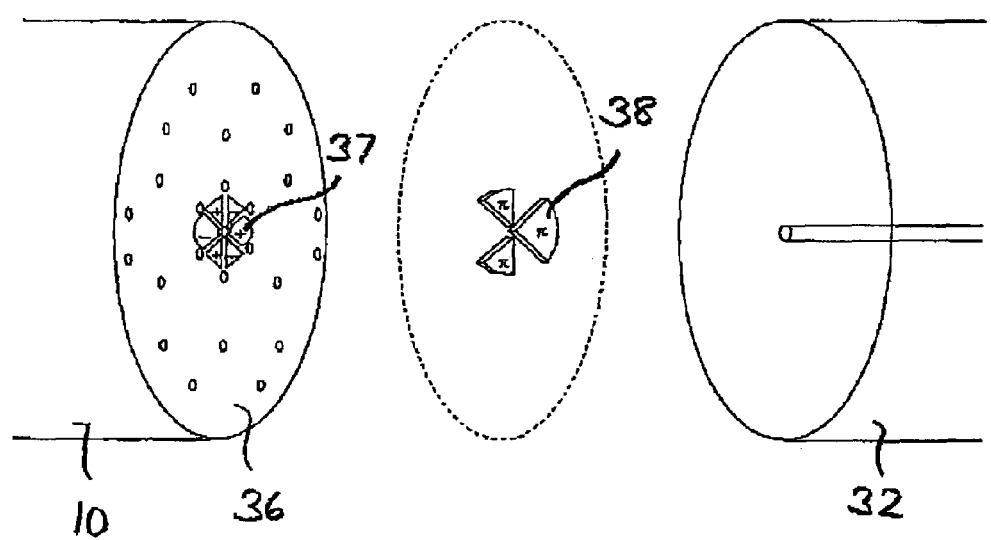
FIG. 15 illustrates a complex spatial electromagnetic field converter that is integrated with an end facet of a waveguide.

FIG. 15 illustrates a complex spatial electromagnetic field converter 38 that is integrated with the end facet 36 of the microstructured waveguide 10 or alternatively, with the end facet of the single mode fiber 32. In the figure, the converter 38 is shown separated from the end facet 36 for clarity only. In an operating system, the converter 38 is positioned at the end facet 36, and the microstructured fiber 10 and the single mode fiber 32 are fused together, e.g. by gluing. The phase variations 37 of the mode propagating through the microstructured fiber 10 is illustrated at the end facet 36 in the same way as in FIG. 6. The complex spatial electromagnetic field converter 38 is adapted to convert the mode of the microstructured waveguide 10 into the mode of the single mode step index fiber 32. Thus, light may travel from the single mode fiber 32 towards the microstructured waveguide 10, or, light may travel from the microstructured waveguide 10 towards the single mode fiber 32. In the illustrated example, the phase shift of the converter 38 is equal to $\pi$, i.e. the difference in travelling distance of an electromagnetic field propagating through an area marked with $\pi$ and an electromagnetic field propagating through a surrounding area is half a wavelength. However, a specific substance, e.g. the substance of the microstructured fiber 10 may be deposited onto the and facet 36 of the fiber 10, or, the fiber 32, with a height profile that provides the phase shifts needed for the desired electromagnetic field conversion. In the illustrated example, a stepped height profile is indicated but it is obvious that a height profile of any desired shape may be provided. Since the height is small, i.e. on the order of half a wavelength, the height profile does not mechanically influence the fusing of the two fibers 10, 32. Alternatively, a fiber may be cleaved to provide the desired height profile at the end facet of the fiber.

The desired conversion may also be provided by provision of a material with a desired refractive index profile at the end facet of the fiber in question without changing the surface of the end facet, i.e. without a height or a depth profile, for example by doping of the material at the end facet.

The desired phase shifting may also be provided by removal, e.g. etching, of material from the end facet 37 of the microstructured fiber 10, or, from the end facet of the fiber 32, with a depth profile providing the desired phase shift. Further, the added or removed material may have a desired refractive index profile and may be birefringent so that, in combination with a desired height or depth profile, any desired phase, amplitude, and polarization conversion may be provided.

The invention claimed is:

1. A system for conversion of modes of electromagnetic fields propagating through waveguides, comprising:
   a microstructured waveguide for propagation of an electromagnetic field with a phase that changes sign across a cross-section of the microstructured waveguide; and
   a complex spatial electromagnetic field converter, that is positioned external to the microstructured waveguide, for reception of at least a part of a first electromagnetic field for modulation of the received field into a second electromagnetic field, and wherein at least one of the first and second electromagnetic fields matches a mode of the microstructured waveguide having a phase that changes sign across the cross-section of the microstructured waveguide.

2. A system according to claim 1, wherein the microstructured waveguide is a microstructured optical fiber.

3. A system according to claim 2, wherein the optical fiber is a photonic band gap fiber.

4. A system according to claim 1, wherein the microstructured waveguide is a part of an integrated optical device.

5. A system according to claim 1, wherein the complex spatial electromagnetic field converter comprises resolution elements (x, y), each resolution element (x, y) modulating phase and amplitude of electromagnetic radiation incident thereon with a predetermined complex value $a(x, y)e^{i\phi(x, y)}$.

6. A system according to claim 5, wherein the complex spatial electromagnetic field converter further modulates polarization of the electromagnetic radiation incident thereon.

7. A system according to claim 5, wherein each resolution element is addressed electrically.

8. A system according to claim 5, wherein each resolution element is addressed optically.

9. A system according to claim 5, wherein the complex spatial electromagnetic field converter is a spatial light modulator.

10. A system according to claim 1, wherein the complex spatial electromagnetic field converter comprises a diffractive optical element.

11. A system according to claim 9, wherein the complex spatial electromagnetic field converter comprises a holographic optical element.

12. A system according to claim 11, wherein the holographic optical element is a Fresnel holographic optical element.

13. A system according to claim 1, wherein the first electromagnetic field is generated by at least two light sources.

14. A system according to claim 1, wherein the second electromagnetic field matches desired propagating modes of at least two waveguides.

15. A system according to claim 13, wherein the second electromagnetic field matches desired propagating modes of at least two waveguides.

16. A system according to claim 13, further providing switching.

17. A system according to claim 1, wherein the complex spatial electromagnetic field converter is dynamically adjustable.

18. A system according to claim 1, wherein the second electromagnetic field is rotatable for matching of the second electromagnetic field with the mode of the microstructured waveguide.

19. A system according to claim 1, comprising GRIN lenses and a micro-hologram for integration of the system into a waveguide module.

20. A system according to claim 19, wherein the waveguide module is a fiber coupling module fusible to optical fibers.

21. A system according to claim 10, wherein the complex spatial electromagnetic field converter comprises a Fresnel diffractive optical element.

22. A system according to claim 10, wherein the complex spatial electromagnetic field converter comprises a Fourier diffractive optical element.

23. A system according to claim 1, wherein the complex spatial electromagnetic field converter is integrated with an end facet of a waveguide.

24. A system according to claim 23, wherein a substance is situated at the end facet of the waveguide with a refractive Index profile that provides phase and amplitude shifts needed for the electromagnetic field modulation.

25. A system according to claim 24, wherein the substance is deposited onto the end facet of the waveguide with a height profile that provides the phase and amplitude shifts needed for the electromagnetic field modulation.

26. A system according to claim 23, wherein a substance is deposited onto the end facet of the waveguide with a height profile that provides phase and amplitude shifts needed for the electromagnetic field modulation.

27. A system according to claim 26, wherein the substance is birefringent for provision of a desired polarization shift.

28. A system according to claim 23, wherein material is removed from the end facet of the waveguide with a depth profile providing phase, amplitude, and polarization shift for the electromagnetic field modulation.

* * * * *

UNITED STATES PATENT AND TRADEMARK OFFICE
CERTIFICATE OF CORRECTION

PATENT NO.        : 7,292,749 B2  
APPLICATION NO.   : 10/492682  
DATED             : November 6, 2007  
INVENTOR(S)       : Jesper Gluckstad et al.

It is certified that error appears in the above-identified patent and that said Letters Patent is hereby corrected as shown below:

On the title page, (in item 75), please correct the cities of the inventors to the following:

Fredericksberg, should be changed to Frederiksberg

Kobenhavnnv should be changed to Kobenhavn

Signed and Sealed this

Twenty-ninth Day of April, 2008

JON W. DUDAS  
*Director of the United States Patent and Trademark Office*